US008689343B2

(12) United States Patent
De Laet

(10) Patent No.: US 8,689,343 B2
(45) Date of Patent: *Apr. 1, 2014

(54) SYSTEM AND METHOD FOR SECURELY TRANSMITTING VIDEO DATA

(75) Inventor: Rick De Laet, Alpharetta, GA (US)

(73) Assignee: Manufacturing Resources International, Inc., Alpharetta, GA (US)

( * ) Notice: Subject to any disclaimer, the term of this patent is extended or adjusted under 35 U.S.C. 154(b) by 406 days.

This patent is subject to a terminal disclaimer.

(21) Appl. No.: 13/019,087

(22) Filed: Feb. 1, 2011

(65) Prior Publication Data
US 2012/0030769 A1 Feb. 2, 2012

Related U.S. Application Data

(63) Continuation-in-part of application No. 12/258,042, filed on Oct. 24, 2008.

(60) Provisional application No. 61/300,266, filed on Feb. 1, 2010.

(51) Int. Cl.
H04L 9/00 (2006.01)

(52) U.S. Cl.
USPC .......................................................... 726/26

(58) Field of Classification Search
USPC .......................................................... 726/26
See application file for complete search history.

(56) References Cited

U.S. PATENT DOCUMENTS 5,663,952 A * 9/1997 Gentry, Jr. ..................... 370/252
6,100,906 A * 8/2000 Asaro et al. ................... 345/539

(Continued)

FOREIGN PATENT DOCUMENTS

EP 1640337 3/2006
WO 9608892 3/1996

Primary Examiner — Kambiz Zand
Assistant Examiner — Aubrey Wyszynski
(74) Attorney, Agent, or Firm — Standley Law Group LLP

(57) ABSTRACT

Exemplary embodiments provide a system and method for securely transmitting video data to an electronic display. The video data may be transmitted using a wired or wireless application. Raw video data is encoded as a plurality of JPEG frames. A plurality of primary packets are created which may contain one frame or a portion of a frame of video. Each primary packet contains a unique header with information about the packet and a unique security key. A redundant packet and header are created for each primary packet and header. After transmission each packet and header may be analyzed to determine if it was transmitted properly. If the primary packet was not transmitted properly or was an unintended transmission, the system may discard the primary packet and proceed with the redundant packet. If the redundant packet was not transmitted properly or was an unintended transmission, the entire frame may be discarded and the previously accepted frame may be repeated within the video decoder. If multiple frames are discarded, the system may display a default image. The packets are re-assembled and displayed if they are the intended transmission.

A system and method for securely transmitting video data to an electronic display. The video data may be transmitted using a wired or wireless application. Raw video data may be encoded as a plurality of frames. A plurality of packets may be created which may contain one frame or a portion of a frame. Each packet may contain a unique header with information about the packet and a unique security key. After transmission various properties of each packet may be analyzed to determine if they are acceptable. The packets may be re-assembled and displayed if they are the intended transmission. A previous frame, default image, or default video may be displayed if any of the packets are not acceptable. Alternatively, a pair of packets may be transmitted together so that if a primary packet is rejected, the system could analyze a redundant packet to complete the frame and provide a minimal interruption of video signal.

19 Claims, 4 Drawing Sheets

(56) References Cited

U.S. PATENT DOCUMENTS

| | | | |
|---|---|---|---|
| 6,222,841 B1* | 4/2001 | Taniguchi | 370/389 |
| 6,698,020 B1 | 2/2004 | Zigmond et al. | |
| 7,581,094 B1* | 8/2009 | Apostolopoulos et al. | 713/160 |
| 7,636,927 B2 | 12/2009 | Zigmond et al. | |
| 7,810,114 B2 | 10/2010 | Flickinger et al. | |
| 7,813,694 B2 | 10/2010 | Fishman et al. | |
| 2002/0019933 A1* | 2/2002 | Friedman et al. | 713/160 |
| 2002/0163513 A1 | 11/2002 | Tsuji | |
| 2002/0163916 A1* | 11/2002 | Oskouy et al. | 370/395.31 |
| 2002/0194609 A1* | 12/2002 | Tran | 725/95 |
| 2003/0117428 A1 | 6/2003 | Li et al. | |
| 2003/0161354 A1 | 8/2003 | Bader et al. | |
| 2003/0196208 A1 | 10/2003 | Jacobson | |
| 2005/0088984 A1* | 4/2005 | Chin et al. | 370/313 |
| 2006/0150222 A1 | 7/2006 | McCafferty et al. | |
| 2006/0160614 A1 | 7/2006 | Walker | |
| 2007/0165955 A1 | 7/2007 | Hwang et al. | |
| 2008/0008471 A1 | 1/2008 | Dress | |
| 2008/0034205 A1 | 2/2008 | Rossman et al. | |
| 2008/0037466 A1* | 2/2008 | Ngo et al. | 370/329 |
| 2008/0170028 A1 | 7/2008 | Yoshida | |
| 2010/0083305 A1 | 4/2010 | Acharya et al. | |
| 2010/0104003 A1* | 4/2010 | Dunn et al. | 375/240.01 |
| 2011/0047567 A1 | 2/2011 | Zigmond et al. | |

* cited by examiner

SYSTEM AND METHOD FOR SECURELY TRANSMITTING VIDEO DATA

CROSS-REFERENCE TO RELATED APPLICATIONS

This application is a non-provisional of U.S. Application No. 61/300,266 filed Feb. 1, 2010 which is herein incorporated by reference in its entirety. This application is a continuation-in-part of U.S. application Ser. No. 12/258,042 filed on Oct. 24, 2008 which is herein incorporated by reference in its entirety.

TECHNICAL FIELD

Exemplary embodiments relate generally to a system and method for securely transmitting video data to electronic displays.

BACKGROUND AND SUMMARY OF EXEMPLARY EMBODIMENTS

Electronic displays have become useful for not only indoor entertainment purposes, but are now being utilized for indoor and outdoor advertising/informational purposes. For example, liquid crystal displays (LCDs), plasma displays, organic light-emitting diodes (OLED) and many other flat panel displays are now being used to display information and advertising materials to consumers in locations outside of their own home and/or within airports, arenas, stadiums, restaurants/bars, gas station pumps, billboards, and even moving displays on the tops of automobiles or on the sides of trucks. In some cases, the electronic display is hard wired to the source of the video signal. In other instances, hard wiring the signal transmission for these devices would either be cost-prohibitive or impossible due to the nature of the mounting surface or surrounding environment and in some cases the fact that the display is attached to a moving vehicle. Thus, the video data for some of these displays must be transmitted wirelessly.

Furthermore, the popularity of high-definition television (HDTV) has created a demand for high-quality video and picture displays where previously a lower quality would suffice. A high-quality video signal typically contains a larger amount of data and thus poses additional problems based on the bandwidth available for transmission.

Another problem in transmitting this data is the risk of unintentional or intentional interference with the data transmission by a third party. For example, although the user has sent intended data to the displays, a third party may interject their own data and attempt to transmit alternative and possibly offensive material to the displays. These third parties may interject with wired setups by locating the source of the video, disconnecting it, and attaching their own source to send to the displays. In wireless applications, third parties may wirelessly send their own signals to receivers and override the intended signals. Therefore, there exists a need to securely transmit high-quality image data to electronic displays in both wired and wireless applications.

Exemplary embodiments provide a system and method for securely transmitting video data to an electronic display. The video data may be transmitted using a wired or wireless application. Raw video data may be encoded as a plurality of frames. One or more packets may be created which may contain one frame or a portion of a frame of video. Each packet may contain a unique header with information about the packet and possibly a unique security key. After transmission various properties of each packet may be analyzed to determine if they are acceptable (i.e. was it the intended transmission, was it transmitted properly, etc.). The packets may be re-assembled and displayed if they are the intended transmission. A default image, default video, or previously accepted frame may be displayed if a packet is not transmitted properly or the received packet is not the intended transmission. If a single packet is missing or is unintended then the frame is likely incomplete and the previous frame may be repeated. Additional standard wireless encryption may also be used if utilizing a wireless application.

Alternatively, a pair of packets (primary and redundant) may be created from the frame and transmitted together so that if a primary packet is rejected (for any number of reasons), the system could analyze the redundant packet and use the redundant packet (if acceptable). It has been found that this alternative embodiment can provide a stream of data to displays that is very reliable (98% transmission or better) and rarely results in any interruption of the video (and sometimes audio signal).

The exemplary embodiments herein disclosed are not intended to be exhaustive or to unnecessarily limit the scope of the invention. The exemplary embodiments were chosen and described in order to explain the principles so that others skilled in the art may practice the embodiments. Having shown and described exemplary embodiments, those skilled in the art will realize that many variations and modifications may be made to affect the described invention. Many of those variations and modifications will provide the same result and fall within the spirit of the exemplary embodiments. It is the intention, therefore, to limit the embodiments only as indicated by the scope of the claims.

BRIEF DESCRIPTION OF THE DRAWINGS

A better understanding will be obtained from a reading of the following detailed description and the accompanying drawings wherein identical reference characters refer to identical parts and in which.

DETAILED DESCRIPTION OF PREFERRED EMBODIMENTS

Figure 1:
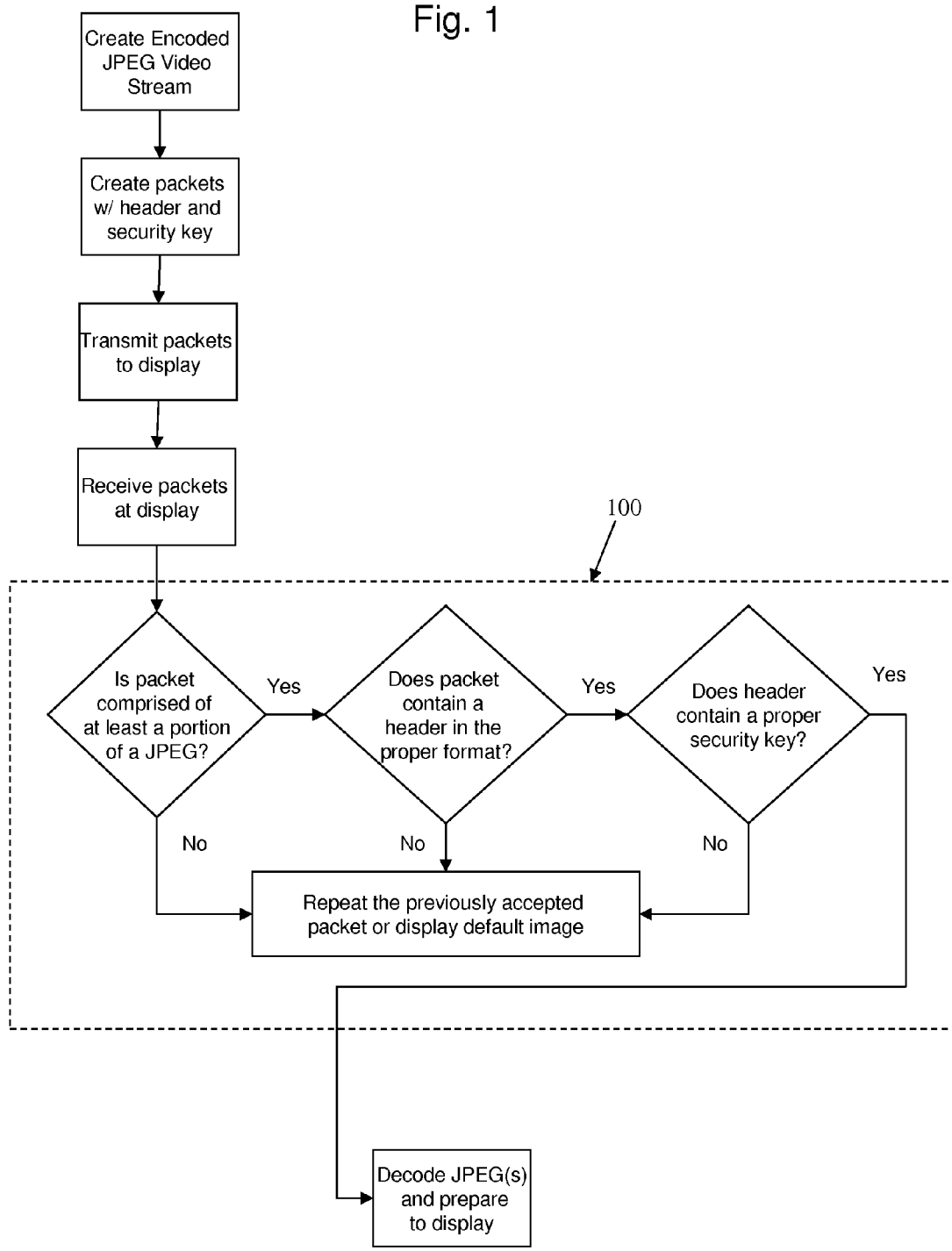
FIG. 1 is a flow chart showing the steps in an exemplary embodiment.

Referring now to FIG. 1, the source images or video may first be encoded as a series of frames. In an exemplary embodiment the frames may be encoded as a series of JPEGs (or other type of image compression format). Obviously, for applications where only static images are to be shown, a single JPEG may be encoded for each image desired. Alternatively, if full motion video is desired, a plurality of JPEGs may be encoded to produce an encoded JPEG image stream.

In other embodiments, other types of encoding and/or compression may be used. For example, some types may be similar to the popular MPEG format. In these formats, for compression purposes, only a small number of full captures (entire frames) may be encoded. These full captures are known as Intra-Frames (I Frames). Between the I Frames a full image may not be saved, but rather only the parts of the picture that have changed between it and the frame before.

These 'difference frames' are known as Predicted Frames (P Frames). As well as P Frames, Bi-directional frames (B Frames) may also be kept. These B Frames are not actually frames but are better thought of as in-between data about the previous frame and the next frame after it. It should be noted that any reference to 'frames' in this application may symbolize I Frames, P Frames, or B Frames in a MPEG-type encoding system or alternately 'frames' may symbolize a JPEG image (or other still-image encoding method).

There is of course a number of different compression techniques available for compressing the data for full motion video or still images and any method may be practiced with exemplary embodiments. An exemplary embodiment may produce an encoded JPEG stream by using one or more ADV212 single-chip JPEG 2000 codecs, which are commercially available from Analog Devices Inc., Norwood, Mass. www.analog.com. By utilizing hardware with enough bandwidth to support very high data rates, some embodiments may be practiced without compression.

Next, a plurality of packets for sending across the network may be created. The packets may contain a variety of different information. Most notably, a packet contains at least a portion of the image to be displayed. A packet may contain an entire frame, several frames, or it may contain only a fraction of a frame. Each packet also contains a header which comprises instructions for re-assembling the packets into frames once they have been transmitted. The header may contain instructions for the receiving CPU such as: which frame this packet applies to, how many packets comprise this frame, is this a primary or redundant packet, how many frames are in this particular video stream, how to re-assemble the packets into a frame, to which client does the video relate, etc. Each header, although containing different information, may have the same organization or format.

Each header may also contain information regarding on whose behalf the images are being presented (for example if advertising images are being displayed the header may identify the party on whose behalf the advertisement is being displayed). This allows a memory unit either at the transmitter or receiver to record how many advertisements have been shown for a particular party and possibly the total advertising time for an advertising period.

For security purposes, each header may also contain a unique security key which may or many not be dynamically generated for each packet. The security key can be generated according to one of multiple algorithms such as a CRC check sum or more complex algorithms that are altered based on random seeds. The security key may be tied to the particular frame number that the packet corresponds with. Thus the security key may be different for each frame and/or may be different for each packet.

Once the packets and their corresponding headers are generated, this data may be transmitted to a receiving apparatus at the electronic display. This transmission can be completed with a wired application or a wireless application. Wired transmission hardware is relatively well known in the art and thus will not be discussed further.

Regarding wireless applications, a variety of network communications may be used. Various formats of Transmission Control Protocol/Internet Protocol (TCP/IP) may be utilized. An exemplary embodiment may utilize User Datagram Protocol (UDP) as the network communication. Unlike TCP/IP configurations, this protocol stack does not require acknowledgement of each hardware packet, but rather leaves it up to each receiving apparatus to detect and handle lost network packets. Using UDP may be more efficient, especially when using multiple receiving apparatuses.

Once received, each packet is analyzed according to various parameters and either accepted or rejected. The analyzing step 100 is shown in FIG. 1 as only three logical commands, but embodiments may contain less or more commands than what is shown in analyzing step 100. The various parameters may include, but are not limited to, whether the packet itself comprises at least of a portion of a JPEG (or whatever type of frame format is being used). If the packet does not comprise at least of a portion of a JPEG, then it is not the intended transmission (or it has not been transmitted properly) and will be rejected. Another parameter which may be analyzed is the format of the header. As discussed above, the header may contain a number of different pieces of data, and this data may be unique to the specific header of the specific packet. However, the organization of the data within the header may be the same across a group of packets. For example, each header may contain: an indication of whether the images are static images or full motion video, the length of time the image will be displayed (if static) or the length of the video (if full motion), which frame this packet corresponds with, identification of the party on whose behalf the images will be displayed (i.e. client's name for an advertising firm's accounting purposes), and a security key. When the format of the header is analyzed, the system may determine whether the information in the header is of the proper type and is presented in the proper order. If not, then the packet may not be the intended transmission (or was not transmitted properly) and will be rejected.

Also, the security key within the header may be analyzed. Security keys may also have a proper format and the format of the security key may be analyzed. Of course, only a select number of security keys may be authorized and these keys may change dynamically. Thus, the content of the security key itself may be analyzed and compared to the security keys which are authorized for display. In exemplary embodiments, a separate transmission packet may be sent to the receiving apparatus which identifies security key inputs such as seed values and algorithm types so that the receiving apparatus knows how to verify the security keys and even the packets themselves.

After the desired parameters are analyzed, if any of the parameters fail then the packet may be rejected. When a packet is sent and this packet is rejected, there is not enough data to rebuild the frame. If a single packet contains an entire frame, and the packet is rejected, the previously accepted packet may be repeated. When a packet contains only a portion of a frame, the system may repeat the previously accepted frame and wait for the next frame's packets to be sent. If any of the packets from the next frame are also rejected, an embodiment may again repeat the previously accepted frame, or may display a default image or video which is stored at the display. Depending on the frame speed and the images or video being shown, two or more frames may be repeated before this would be noticeable by an observer of the electronic display. Once noticeable, an embodiment may display a default image or video. However, if the parameters are acceptable then the packet is stored as a good packet. If all of the packets for the frame are accepted and stored as good packets, they may be re-assembled into a JPEG image, decoded, and prepared for display.

Exemplary embodiments may display only a static image for a definite period of time. Some embodiments may cycle through several images, showing each image for a definite period of time. These embodiments may send packets at a very low frame rate (1-5 Hz or slower for example). Of course, other embodiments may show full motion video.

Exemplary embodiments may transmit high-definition video (HD) of at least 720i or 720p quality, preferably at 1080i or 1080p.

In addition to the techniques described herein, the use of standard wireless security communication protocols may be used with exemplary embodiments for additional security when a wireless application is desired. Standard encryption methods include, but are not limited to: Wired Equivalent Privacy (WEP), Wi-Fi Protected Access (WPA), Temporal Key Integrity Protocol (TKIP), Extensible Authentication Protocol (EAP), Lightweight Extensible Authentication Protocol (LEAP), Protected Extensible Authentication Protocol (PEAP), 802.11i, WPA2, RADIUS servers, and pre-shared keys (PSK). RF shielding techniques may also be used to ensure that transmitted signals do not leak out of the structures in which they are being sent, giving hackers an opportunity to discover the source signals and hack them.

Figure 2:
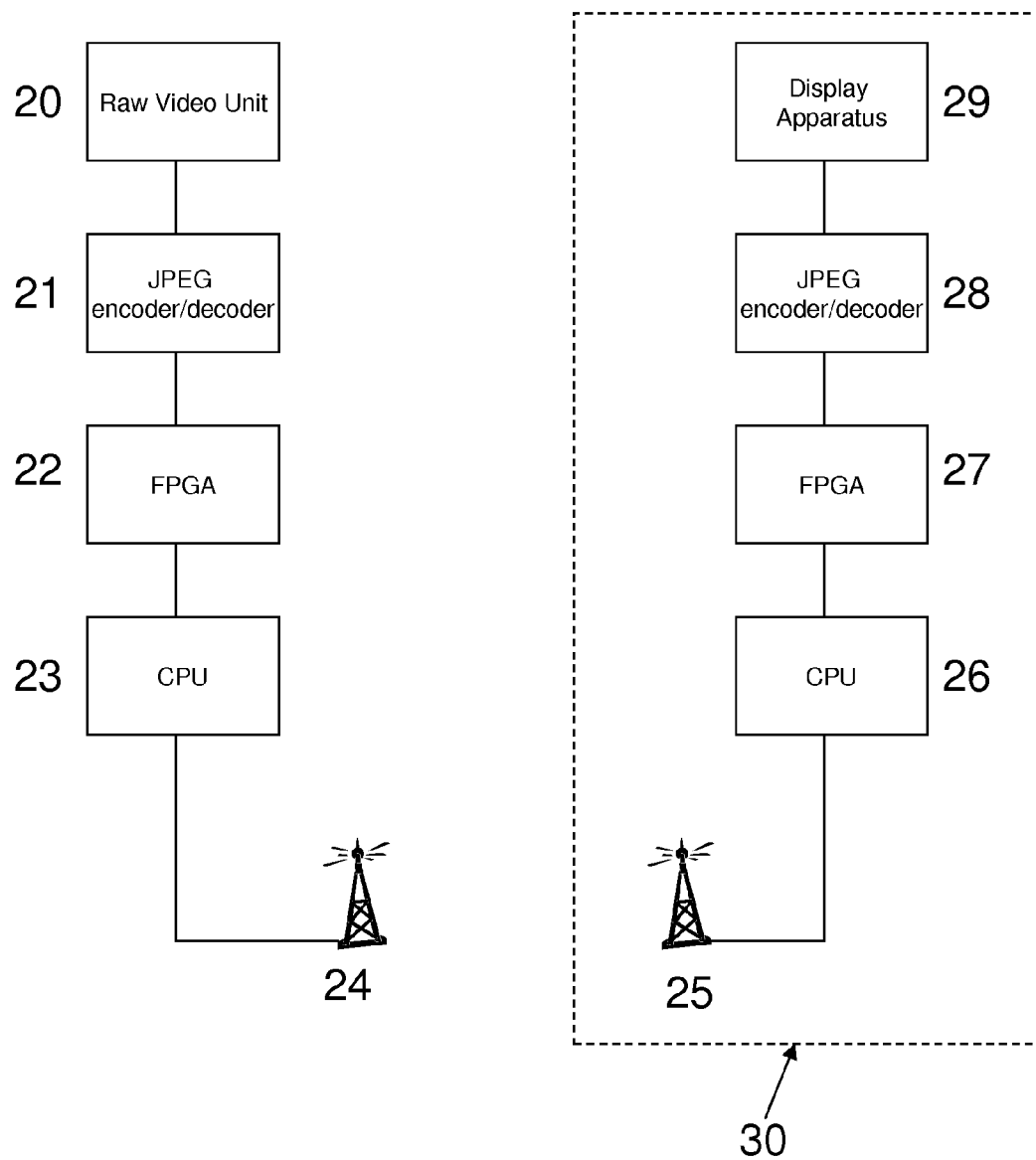
FIG. 2 is a schematic showing the components of an exemplary embodiment.

FIG. 2 shows how the structure of an exemplary embodiment may be connected. The raw video unit 20 may send the raw video to the JPEG encoder/decoder 21 to produce an encoded JPEG video stream. This data may then be sent to the field-programmable gate array (FPGA) 22 and on to the central processing unit (CPU) 23 where each JPEG frame may be broken into one or more packets, provided with a header and a corresponding security key. The packets are then sent to the transmitter 24, which transmits the packets. A receiver 25 is adapted to receive the packets. Again it is worth noting, that although the transmitter 24 and receiver 25 are shown in FIG. 2 as a wireless application, embodiments may be practiced for both wired and wireless applications.

The receiver 25 receives the transmission and may send the packets to another CPU 26 for analysis and re-constructing the packets into their proper JPEG frames. The CPU 26 may sends the resulting data to another FPGA 27 and then to a second JPEG encoder/decoder 28 to decode the JPEGs back into raw video. The raw video may be sent to the display apparatus 29 which may comprise an electronic display of any of the following types: liquid crystal display (LCD), plasma display, organic light emitting diode display (OLED), or digital light processing display (DLP). The display apparatus 29 may comprise other components as well, including but not limited to a video buffer.

The components 26-29 are known collectively as a receiving display assembly 30. It should be noted that embodiments may use a plurality of receiving/display assemblies 30 in connection with one transmitter 25.

Figure 3:
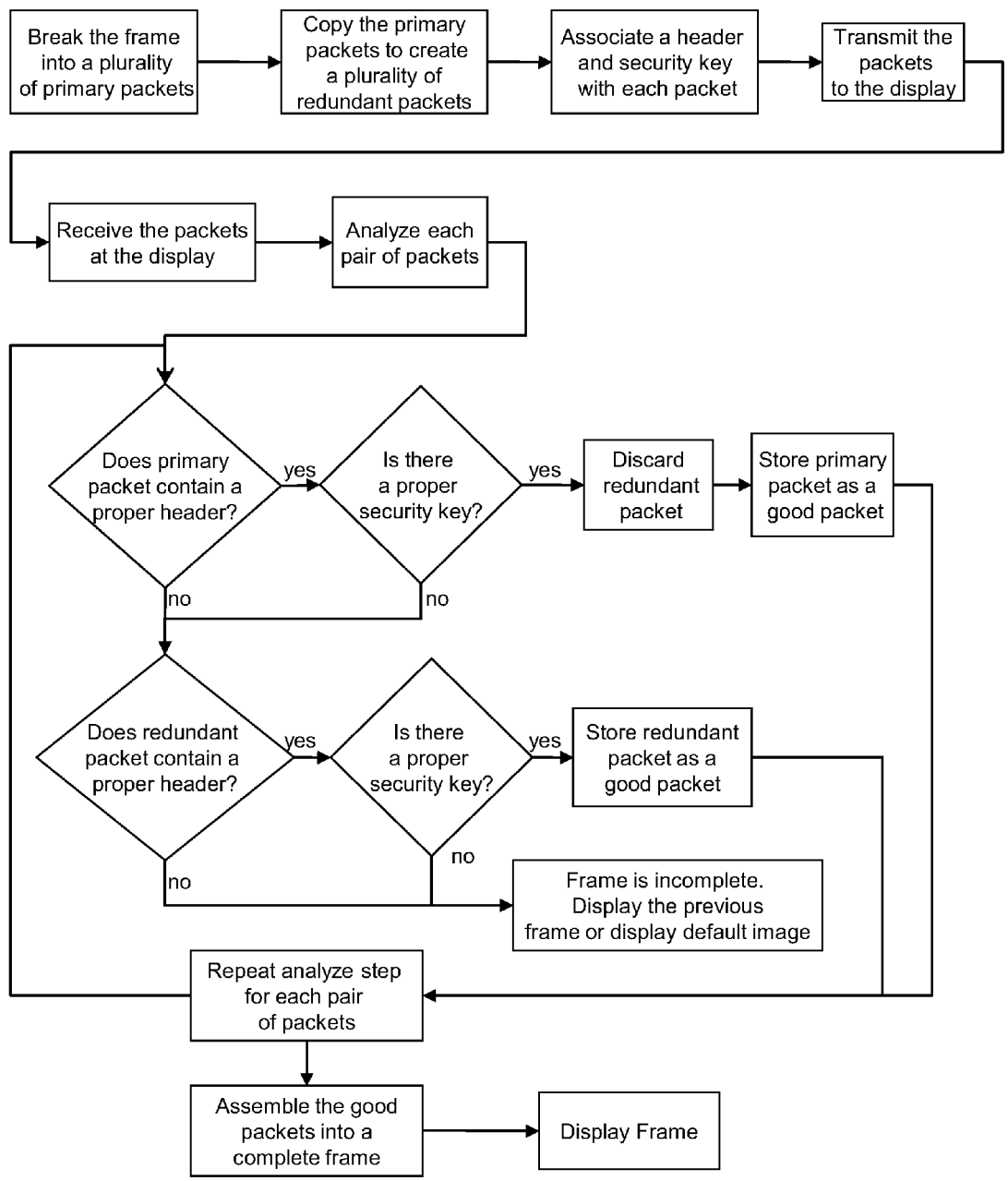
FIG. 3 is a flow chart showing the steps in an embodiment which transmits both primary and secondary packets.

FIG. 3 is a flow chart showing the steps for an embodiment which transmits two packets (primary and redundant) together. Once the encoded frame is created (JPEG, MPEG—any version, QuickTime, Bitmap, GIF, TIFF, etc), the frame may be divided into a plurality of primary packets. This embodiment may then create a plurality of redundant packets. The redundant packets may be created by simply copying the primary packets or by returning to the original frame again and creating a plurality of redundant packets from the original frame. Both packets may be transmitted to, and received at, one or more displays. Once the packets are received, a CPU (or appropriate microprocessor) may analyze the packets.

Various properties of the packets may then be analyzed. In this embodiment, the system first looks to the primary packet to determine if it is acceptable/good. For the embodiment shown in FIG. 3, the header of the packet is analyzed first and it may be determined if this header is proper (i.e. is it in the proper format, etc.). If the header is proper, the system may then analyze the security key contained within the header and determine if this is an acceptable security key. If the security key is also proper, then the primary packet is the intended transmission and has been transmitted properly (ie, it's a good packet). In this scenario, the redundant packet may be discarded and the primary packet is stored as a good packet.

In an alternate scenario, if either the header format or the security key is unacceptable, the system abandons the primary packet and begins an analysis of the redundant packet. A similar process as described above for the primary packet may then be repeated for the redundant packet. The format (and possibly some of the contents) of the header may be analyzed. If acceptable, the security key may then be analyzed. If acceptable, the redundant packet may be stored as a good packet. Although the use of primary and redundant packets has been found to drastically reduce the number of 'dropped packets/frames', it may still be possible to have both the primary and redundant packets rejected by the system. If this happens, the system may discard the remaining packets in the current frame and display the previously accepted completed frame. This may not be necessary, as it has been found that in some applications the duplicate packets can essentially remove all dropped packets. However, occasional interruptions of the communication between the transmitter and receiver can occur. In this instances, after a certain number of frames have failed to transmit properly, the system may display a default image which may be stored at the display (possibly within CPU 26 or some video buffer).

Of course, the system may analyze other portions of the packets, either in addition to or instead of the portions that are shown in FIGS. 1 and 3. Some embodiments may simply analyze the security key (either its contents or just the existence of one).

If either the primary or redundant packet is good, it is stored and the analyzing process is repeated for each remaining packet in the frame. Each good packet is stored until the system has enough packets to re-build the frame. The packets may then be reconstructed into the original frame and this frame may be decoded and prepared for display. This entire process is then repeated for each frame to create a secure system and method for wirelessly transmitting full motion video.

Figure 4:
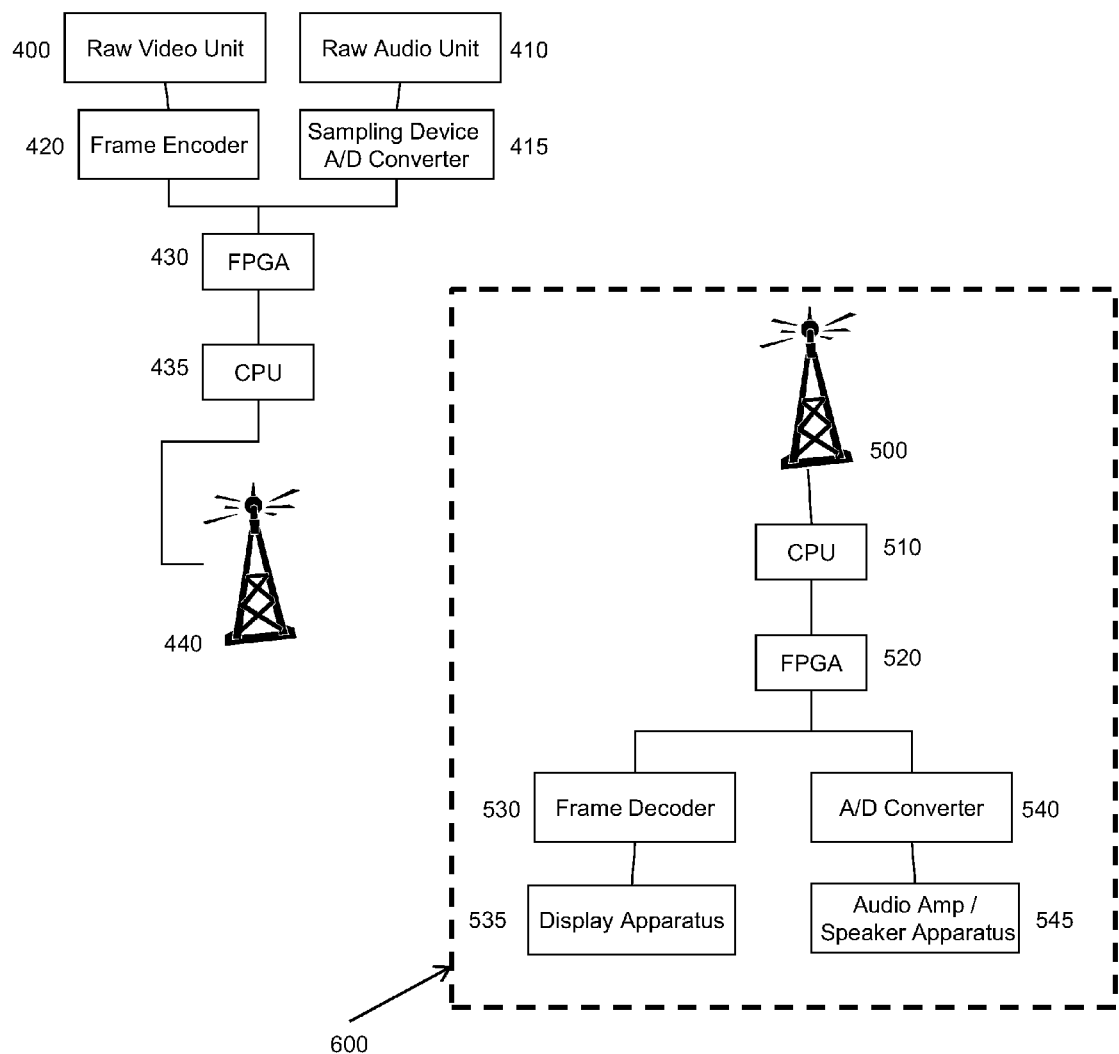
FIG. 4 shows a schematic for an embodiment which securely transmits both audio and video.

FIG. 4 shows an embodiment which securely transmits both audio and video. While this embodiment can be practiced with both the single packet design as well as the redundant packet design, the redundant packet design will now be described. The raw video unit 400 may send the raw video to the frame encoder 420 to produce an encoded image for each frame. This data may then be sent to the field-programmable gate array (FPGA) 430 and on to the central processing unit (CPU) 435 where each frame may be broken into one or more packets, provided with a header and a corresponding security key. The raw audio unit 410 may send the raw audio to a sampling device and analog/digital (A/D) converter 415, the resulting digital sample may then be sent to the FPGA 430 and on to the CPU 435 (or appropriate microprocessor). Once at the CPU both the digital audio sample and the encoded frame may be converted into packets. The encoded frame may be divided into several packets while the digital audio sample may be contained in a single packet. When using the redundant packet design, these packets may be copied so that there are primary and redundant packets. Redundant packets may be used with only the audio, only the video, or both audio and video.

As discussed above, the CPU 435 may generate a header for each packet that contains a number of different pieces of information. Specifically when using the redundant packet design, the headers for the redundant packets may contain a 'marker' or 'flag' to notify the system that this particular packet is a redundant packet.

The packets may be sent to the transmitter 440, which transmits the packets. A receiver 500 may be used to receive the packets. An exemplary embodiment would use a Wireless-N connection between the transmitter 440 and receiver 500.

Once the packets are received at the receiver 500, they may be sent to another CPU 510 (or appropriate microprocessor) for analysis. As shown in FIG. 3, if a packet is transmitted properly and is the intended transmission, it is stored as a 'good' packet. For video, once enough good packets have been stored, the good packets may be re-assembled into the original frame and placed in a queue. For audio, once a good packet is received it is also placed in the queue. The queue may be a buffer-type storage device.

At this point it is should be noted that when sending both audio and video data it is important to sync the two data streams together. Thus, it may be important for the audio data and video data to reach the speaker apparatus 545 and display apparatus 535 at close to the same time. This could be done in a number of ways. One such way would be to determine the relationship between the amount of time required to send a queued video frame to the display apparatus 535 and equate this with a byte number (or file size) of the audio sample. It has been found that the precise size of the audio sample can be 'trimmed' to allow the audio to be sent at a specific time in order to sync up with the video frame. It has been found that trimming bytes off the audio sample does not produce a large defect in the overall sound quality. Thus, the time for sending the video frame through the FPGA 520, the frame decoder 530, and finally to the display apparatus 535 may be measured. The amount of time for this process can be related to the number of bytes in the audio sample packet (the less bytes—the faster the audio transfers to the speaker apparatus, the more bytes—the slower the audio transfers to the speaker apparatus). A relationship can then be determined where a pre-determined number of bytes for the audio file allows for the audio to transfer to the speaker apparatus 545 at the same time that the video frame arrives at the display apparatus 535. To ensure that there will always be audio bytes to trim, the sampling rate at the sampling device 415 may be set higher than the rate of the A/D converter 540.

Again, the display apparatus 535 may comprise an electronic display of any of the following types: liquid crystal display (LCD), plasma display, organic light emitting diode display (OLED), or digital light processing display (DLP). The display apparatus 535 may comprise other components as well, including but not limited to a video buffer.

The components 500-545 are known collectively as a receiving display assembly 600. It should be noted that embodiments may use a plurality of receiving/display assemblies 600 in connection with one transmitter 440.

Having shown and described preferred embodiments, those skilled in the art will realize that many variations and modifications may be made to affect the described embodiments and still be within the scope of the claims. Thus, many of the elements indicated above may be altered or replaced by different elements which will provide the same result and fall within the spirit of the claimed embodiments. It is the intention, therefore, to limit the invention only as indicated by the scope of the claims.

What is claimed is:

1. A method for securely transmitting raw video data comprising the steps of:
   encoding said raw video data into a plurality of JPEG frames;
   creating a plurality of primary packets which comprise at least at least a portion of each JPEG frame;
   creating a plurality of redundant packets which comprise the same portion of each JPEG frame as an associated primary packet;
   associating a unique header with each of said packets;
   transmitting said packets and associated headers to a receiving device;
   analyzing the headers of each primary packet and
      discarding the redundant packet and storing the primary packet if the header is acceptable, or
      analyzing the header of the associated redundant packet if the header of the primary packet is unacceptable and storing the redundant packet if the header of the redundant packet is acceptable; and
   assembling the stored packets into JPEG frames;
   decoding the JPEG frames into video data.

2. The method of claim 1 wherein
   the analyzing steps compare the format of the header to an acceptable format.

3. The method of claim 1 wherein
   each header contains a key and the analyzing step compares the key of each header with a pre-approved key.

4. The method of claim 1 further comprising the steps of:
   presenting an acceptable security key; and
   placing the security key within each of said headers.

5. The method of claim 4 wherein:
   the analyzing step comprises comparing the security key of each header with the acceptable security key.

6. The method of claim 1 further comprising the steps of:
   storing the video data in a video buffer.

7. The method of claim 1 wherein:
   said transmitting step is performed by a wireless transmitter which encrypts the packets with wireless encryption prior to transmitting.

8. The method of claim 1 wherein:
   the decoding step further comprises repeating the prior JPEG frame if a JPEG frame is incomplete.

9. A system for securely transmitting video data comprising:
   an encoding device adapted to encode raw video data;
   a first central processing unit in communication with said encoding device and adapted to divide the encoded data into a plurality of primary packets and associated redundant packets and associate a unique header with each packet;
   a transmitting device in communication with said first central processing unit and adapted to transmit said packets and headers;
   a receiving device adapted to receive said packets and headers;
   a second central processing unit in communication with said receiving device and adapted to analyze the headers of each primary packet, and
      discard the redundant packet and store the primary packet if the header is acceptable, or
      analyze the header of the associated redundant packet if the header of the primary packet is unacceptable and store the redundant packet if the header of the redundant packet is acceptable, and
      assemble the stored packets into encoded video data; and
   a decoding device in communication with said second central processing unit and adapted to decode the encoded video data.

10. The system of claim 9 further comprising:
    a video buffer in communication with said decoding device.

11. The system of claim 9 further comprising:
a first field-programmable gate array in communication with said encoding device and said first central processing unit; and
a second field-programmable gate array in communication with said second central processing unit and said decoding device.

12. The system of claim 9 wherein:
said encoding device and said decoding device are JPEG encoder/decoder chips.

13. The system of claim 10 further comprising:
an electronic display in communication with said decoding device and adapted to display the decoded video data.

14. The system of claim 9 wherein:
said transmitting device is a wireless transmitter which encrypts the packets and
headers with wireless encryption prior to transmitting.

15. The system of claim 9 further comprising:
a plurality of further receiving devices adapted to receive the transmitted packets and headers;
a further central processing unit in communication with each of said further receiving devices and adapted to analyze the headers of each primary packet, and
  discard the redundant packet and store the primary packet if the header is acceptable, or
  analyze the header of the associated redundant packet if the header of the primary packet is unacceptable and store the redundant packet if the header of the redundant packet is acceptable, and
  assemble the stored packets into encoded video data; and
a further decoding device in communication with each further central processing unit and adapted to decode the encoded video data.

16. The system of claim 15 further comprising:
an electronic display in electrical communication with each decoding device.

17. A method for securely transmitting raw video data to an electronic display comprising the steps of:
  encoding the raw video data into a plurality of JPEG frames;
  creating a plurality of primary packets which comprise at least at least a portion of each JPEG frame;
  creating a redundant packet for each primary packet which comprises the same portion of each JPEG frame as the associated primary packet;
  associating a unique header with each of said packets, each header being in the proper format;
  placing an original key within each header;
  transmitting said packets and headers to a receiving device;
  analyzing the headers of each primary packet and
    discarding the redundant packet and storing the primary packet if the received header is in the proper format and the key matches the original key, or
    analyzing the header of the associated redundant packet if the header of the primary packet is not in the proper format or the key does not match the original key, and storing the redundant packet and discarding the primary packet if the header of the redundant packet is in the proper format and the key matches the original key, or
    discarding the primary and redundant packet if the header of the redundant packet is not in the proper format or the key does not match the original key; and
  assembling the stored packets into JPEG frames;
  decoding the JPEG frames into video data; and
  displaying the video data.

18. The method of claim 17 wherein:
said decoding step further comprises repeating a JPEG frame if both the primary and redundant packet were discarded for an upcoming JPEG frame.

19. The method of claim 18 wherein:
said displaying step further includes displaying a default image if more than one JPEG frame has both a primary and redundant packet discarded.

* * * * *